United States Patent [19]
Smith et al.

[11] Patent Number: 5,456,492
[45] Date of Patent: Oct. 10, 1995

[54] HYBRID (AUGMENTED) GAS GENERATOR

[75] Inventors: Bradley W. Smith, Ogden; Randall J. Clark, Pleasant View, both of Utah; Leland B. Kort, Lakewood, Colo.; Michael H. Wong, Ogden, Utah

[73] Assignee: Morton International, Inc., Chicago, Ill.

[21] Appl. No.: 247,785

[22] Filed: May 23, 1994

Related U.S. Application Data

[63] Continuation-in-part of Ser. No. 123,311, Sep. 17, 1993, which is a continuation-in-part of Ser. No. 989,854, Dec. 14, 1992, Pat. No. 5,290,060.

[51] Int. Cl.⁶ ..................................................... B60R 21/26
[52] U.S. Cl. ........................................ 280/737; 137/68.13
[58] Field of Search ..................................... 280/737, 741, 280/740, 728 R; 222/3; 137/68.2, 68.1

[56] References Cited

U.S. PATENT DOCUMENTS

| | | | |
|---|---|---|---|
| 3,117,424 | 1/1964 | Hebenstreit | 222/3 |
| 3,232,481 | 2/1966 | Hebenstreit | 222/3 |
| 3,913,604 | 10/1975 | Hanson | 137/68.2 |
| 4,077,423 | 3/1978 | Kasagi et al. | 137/68.2 |
| 4,600,123 | 7/1986 | Galbraith | 137/68.2 |
| 5,016,914 | 5/1991 | Faigle | 280/741 |
| 5,197,622 | 3/1993 | Anderson | 137/68.1 |

*Primary Examiner*—Karin L. Tyson
*Attorney, Agent, or Firm*—Gerald K. White

[57] ABSTRACT

A hybrid gas generator includes a chamber for storing inert gas under high pressure, a chamber for storing pyrotechnic material used to heat the stored gas, a diffuser which contains gas orifices for dispensing gas uniformly into an air bag assembly, a thin metal diaphragm to provide a pressure seal between the storage chamber and the diffuser, and a metal disk that is scored with a circular groove to seal the pyrotechnic material from the stored gas. Upon receiving an electrical signal an initiator fires and ignites the pyrotechnic charge. As pressure in the combustion chamber rises and exceeds the pressure in the storage chamber the metal disk that is scored with a circular groove ruptures and allows hot gas and burning pyrotechnic material to heat the gas and cause a rapid pressure rise in the gas storage chamber. When the pressure in the gas storage chamber exceeds the rupture pressure of the thin metal diaphragm between the storage chamber and the diffuser, it ruptures and allows the heated gas to vent through the diffuser orifices into the air bag assembly. Other features include the use of metal stampings for many of the parts instead of machined or forged parts, an end plug made in one piece with the storage chamber which reduces the number of bulkhead welds, a dimpled or pronged orifice plate which prevents the exiting orifice from being plugged, and a perforated diffuser with small holes which prevent fragments from escaping the inflator without the use of screens or meshes.

5 Claims, 10 Drawing Sheets

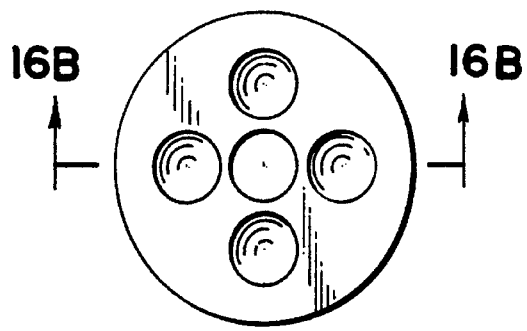
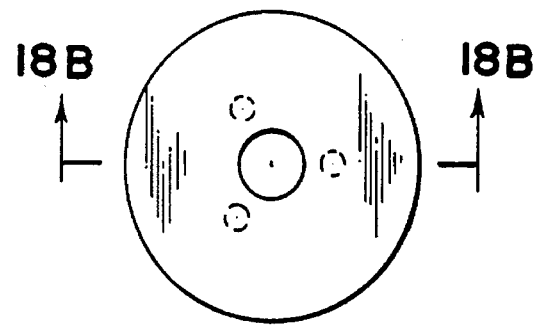
FIG. 16A　　　　　　　　FIG. 18A
FIG. 16B　　　　　　　　FIG. 18B

HYBRID (AUGMENTED) GAS GENERATOR

CROSS REFERENCE TO RELATED APPLICATIONS

This application is a continuation-in-part of a previous application filed in the United States Patent and Trademark Office by William G. Lowe, Linda M. Rink, Walter A. Moore and Bradley W. Smith on Sep. 17, 1993 entitled "PARTICULATE REMOVAL IN INFLATABLE RESTRAINT SYSTEM GAS GENERATORS" and assigned Ser. No. 08/123,311.

The William G. Lowe et al. application bearing Ser. No. 08/123,311, in turn, is a continuation-in-part of a previous application, filed in the United States Patent and Trademark Office by Bradley W. Smith on Dec. 14, 1992, entitled "HYBRID GAS GENERATOR FOR AIR BAG INFLATABLE RESTRAINT SYSTEM" and assigned Ser. No. 989,854, now U.S. Pat. No. 5,290,060.

The disclosures of the patent applications bearing Ser. Nos. 08/123,311 and 989,854 are hereby incorporated by reference herein, and are made a part hereof, including but not limited to those portions which specifically appear hereinafter.

This invention relates to modifications of hybrid (augmented) generators or inflators by means of which improvements in reliability and reduction in the height, weight and cost of construction thereof are obtained, which generators dispense entirely heated air bag inflating gas and provide for easier packaging in modules.

BACKGROUND OF THE INVENTION

Many types of inflators have been disclosed in the art for inflating an air bag for use in an inflatable restraint system. One type involves the utilization of a quantity of stored compressed gas which is selectively released to inflate the air bag. Another type derives a gas source from a combustible gas generating material which, upon ignition, generates a quantity of gas sufficient to inflate the air bag. In a third type, the air bag inflating gas results from the combination of a stored compressed gas and the combustion products of a gas generating material. The last mentioned type is commonly referred to as an augmented gas or hybrid inflator.

Hybrid inflators that have been proposed heretofore are subject to certain disadvantages. They require glass-to-metal seals or other complex sealing methods to maintain the high pressure seal and/or require an actuation means (mechanical or pyrotechnic) to open the flow passages to the air bag. Many hybrid inflator arrangements dispense cold inflating gas followed by heated gas ("S" curve). This is a disadvantage for an air bag driver system. Additionally, end diffusers typically used on hybrid inflators make packaging in modules difficult.

Thus, there is a need and a demand for improvement in hybrid inflators to the end of overcoming the foregoing disadvantages. The present invention was devised to fill the gap that has existed in the art in these respects.

Additionally, in hybrid inflators and other inflators involving the combustion of a gas generating material, the burning of the pyrotechnic (gas generating) and initiation materials invariably results in the undesired production of particulate material. Various approaches have been attempted and/or suggested to deal with such particulate-containing inflator emissions.

One approach has been to simply inflate the air bag with the particulate-containing inflator emission. As a result, particulate material can be vented out from the air bag and into the vehicle. The particulate material is variously sized and typically includes a large amount of material within the respirable range for humans and can potentially cause consequent respiratory discomfort to humans who have respired the particulate. Also, such particulate can easily become dispersed and airborne so as to appear to be smoke and thereby result in the false impression that there is a fire in or about the vehicle.

It has also been proposed to screen the gaseous emission coming from the pyrotechnic portion of such hybrid inflators. For example, U.S. Pat. No. 5,131,680 discloses the inclusion of a circular screen "128" between the body of pyrotechnic material and the orifice through which the pyrotechnically produced emission is passed to the pressurized gas-containing chamber of the hybrid inflator.

Also, U.S. Pat. No. 5,016,914 discloses the inclusion of a filter identified as a metal disk having a plurality of suitably sized openings therein. The disk is disclosed as functioning to trap large particles such as may be present in the generated gas.

Such techniques of filtering or screening the gaseous emission of the pyrotechnic section of the hybrid inflator prior to contact with the stored, pressurized gas of the inflator generally suffer such as from undesirably slowing or preventing the transfer of heat to the stored gas from the relatively hot generated gas and particulate material. In general, such a transfer of heat to the stored gas is desired in hybrid inflators in order to produce desired expansion of the gas. Consequently, the slowing or preventing of desired heat transfer can result in a reduction in the performance of the inflator. Also, the screening or filtering of particulate at the gas exit port of the pyrotechnic chamber can undesirably effect gas flow within the inflator. For example, such treatment can undesirably restrict the flow of gas out of the pyrotechnic chamber, causing the pressure inside the pyrotechnic chamber to increase and thereby increase the potential for structural failure of the pyrotechnic chamber.

The above-identified U.S. Pat. No. 5,016,914 also discloses constraining gas flow to a tortuous path whereby additional quantities of relatively large particles produced by combustion of the gas generating material are separated from the commingled gases as the gases flow toward the inflatable vehicle occupant restraint. As disclosed, various component parts of the vehicle occupant restraint system cooperate to form the described tortuous path. These component parts include the openings in the container which direct the gas into an outer cylindrical diffuser, the container itself which preferably contains gas directing blades positioned therein as well as burst disks to control the flow of the gas generated by ignition of the gas generating material. The patent also discloses that in a preferred embodiment, a coating material, for example, a silicone grease, is coated onto the inner surface of the container to assist in the fusing of particles thereto rather than allowing the particles to rebound into the nitrogen gas jet stream.

Such surface coatings, however, generally suffer in several significant aspects with respect to effectiveness and functioning when compared, for example, to the use of a filter to effect particulate removal.

First, as the nature of such fusion of adhesion of particles onto a coating is a surface phenomenon, the effectiveness of such removal is directly related to the amount of available surface area. In practice, such a surface coating provides a relatively limited amount of contact surface area and, further, the effectiveness of such surface treatment typically is decreased as the available surface area is occupied.

Also, though such an internal surface coating may be of some use in the fusing of solid particles, such a coating would normally be relatively ineffective in trapping liquid phase particles. Furthermore, the process of condensation of liquid phase particles in an inflator normally involves a transfer of heat to the subject contact surface. In the case of such a surface coated with such a grease, such a transfer of heat could undesirably result in the off-gassing of the coating material, for example, production of gaseous byproducts of the coating material, which in turn would undesirably contribute to the toxicity of the gases emitted from such an inflator.

In addition, the effect of the flow of gases within the inflator can raise concerns about the use of inflators which utilize such coatings. For example, the impingement onto such a coating of the hot combustion gases produced within an inflator would normally tend to displace the coating material, particularly since such coatings tend to become softer at elevated temperatures.

Thus, even for the short time periods associated with the operation of such devices neither exclusive nor primary reliance is made by this patent on the use of such a coating to effect particle removal.

There is a continuing need for a safe, simple and effective, economical apparatus and technique for particulate removal from the gaseous emission of such inflators. The removal of such particulate material can prevent, minimize or reduce any discomfort to which a vehicle occupant may be subjected to as a result of the use of such inflators in the system. Furthermore, such particulate removal can prevent safety concerns such as a vehicle occupant unnecessarily panicking when he or she, seeing particulate material having become dispersed and airborne within the vehicle, arrives at the false conclusion that the vehicle is on fire.

SUMMARY OF THE INVENTION

A general object of the invention is to provide an improved inflator apparatus suitable for use in inflating a vehicle occupant restraint.

A more specific objective of the invention is to overcome one or more of the problems described above.

An object of the invention is to provide a hybrid inflator that does not require glass-to-metal seals or other complex sealing methods to maintain the high pressure seal.

Another object of the invention is to provide a hybrid inflator that does not require an actuation means (mechanical or pyrotechnic) to open the passages for the flow of inflation gas to the air bag.

A further object of the invention is to provide an air bag inflator which dispenses, in its entirety, heated gas to the air bag.

Still another object of the invention is to provide for use with such an improved hybrid inflator a centrally located diffuser that provides for easier packaging in modules compared to end diffusers that typically are used in hybrid inflators.

A further object of the invention is to provide a hybrid (augmented) gas generator or inflator in which the parts are made from stampings instead of machined or forged parts which reduces the weight and cost of the inflator, in which the elimination of a weld improves the reliability of the inflator, and in which the provision of a metal disk with a circular groove eliminates the need for a plug to support a thin metal disk because it can support pressure from a stored gas but will rupture when the pressure in a pyrotechnic heater igniter or combustion chamber exceeds that in the storage chamber.

In accomplishing these and other objectives of the invention, there is provided a hybrid gas inflator including an elongated generally cylindrical gas storage chamber for storing an inert gas under high pressure, for example, argon or nitrogen, at 2000 to 4000 pounds per square inch (psi). The hybrid gas inflator also includes a pyrotechnic heater having a combustion chamber which utilizes a granular mixture of boron potassium nitrate ($BKNO_3$) or another suitable pyrotechnic material to heat the stored gas. A thin metal diaphragm, hereinafter termed a "second diaphragm," is utilized to provide a pressure seal between the storage chamber output or controlling orifice and a diffuser for the inflator. The diffuser is attached to the gas storage chamber at about the center of the cylinder and contains a plurality of gas orifices for dispensing gas uniformly into the air bag assembly. This allows the gas to vent into the center of the air bag providing symmetrical inflation of the air bag. Within the diffuser is the second diaphragm which seals the gas storage chamber and ruptures upon deployment.

The gas storage chamber is sealed also from the combustion chamber of the pyrotechnic heater by a thin metal diaphragm hereinafter termed a "first diaphragm." In one embodiment of the invention, this diaphragm is welded around the perimeter thereof to an end of the pyrotechnic heater housing and is backed up with a solid metal plug. The plug seats in an adjacent shoulder covering the nozzle orifice of the combustion chamber thereby providing support for the thin diaphragm across the entire surface thereof. This enables the diaphragm to withstand the loads of the high pressure gas being stored in the storage chamber.

The hybrid gas generator functions, as follows. Upon receiving an electrical control signal, an initiator (squib) in the pyrotechnic heater fires, igniting the pyrotechnic charge ($BKNO_3$). As the pressure in the combustion chamber rises and exceeds the high pressure of the stored inert gas in the storage chamber, the solid metal plug is unseated. Subsequently, when the combustion pressure of the pyrotechnic heater exceeds the inert gas storage pressure, the first thin diaphragm ruptures since it is unsupported. Hot gas and particles from the burning pyrotechnic material heat the stored gas causing a rapid pressure rise in the storage chamber. When the pressure in the storage chamber exceeds the structural capability of the second thin metal diaphragm in the diffuser, ruptures thereof occur. This allows the heated gas in the storage chamber to vent through the diffuser orifices into the air bag assembly. Located between the diffuser diaphragm and the storage chamber are one or more constricting orifices which throttle the flow of gas from the storage chamber and provide for the proper fill rate to the air bag assembly.

In another embodiment of the invention, a metal rupture member, specifically, a metal disk that is scored with a circular groove, seals the pyrotechnic material in the pyrotechnic heater from the stored gas. The circular groove is sized to cause the metal disk seal to fail at a predetermined pressure differential. The disk is welded around its perimeter to the combustion chamber over the nozzle orifice of the pyrotechnic heater. The circular groove is located at a diameter that is larger than the nozzle orifice so that the metal disk can support pressure from the direction of the gas storage chamber but will rupture once the pressure in the igniter chamber exceeds the pressure in the gas storage chamber.

In order to assure that the controlling orifice of the storage chamber is not plugged by the scored thin metal disk during operation of the inflator, a dimpled or pronged orifice plate is provided for reliability. The orifice plate is a pronged orifice plate. The plate can also be of a dimpled configuration with raised sections to prevent plugging during inflator operation.

In still another embodiment of the invention there is provided an apparatus suitable for use in inflating a vehicle occupant restraint. The apparatus includes a container having a first chamber for storing a gas generating material and a second chamber useful in effecting gas redirection. The gas generating material when ignited produces a hot gas that contains particulate of the gas generating material and byproducts thereof. The hot gas is releasable from the first chamber into the second chamber by means of at least one gas exit nozzle.

The second chamber houses a filter placed along the inner wall thereof opposite the gas exit nozzle. The filter is useful in effecting gas redirection and particulate removal from at least a portion of the hot gas released from the first chamber and impinging. The hot gas, having a significantly reduced particulate content, forms an inflation gas for use in inflating the vehicle occupant restraint.

The apparatus also includes a diffuser having at least one controlling orifice for providing passage therein of at least a portion of the inflation gas from the container. The diffuser also includes at least one exit port for dispensing at least a portion of the inflation gas passing therein into the vehicle occupant restraint.

In such an apparatus there is at least an approximately 180° cumulative change in gas direction between gas initially contacting the filter and the passage of the inflation gas into the diffuser.

Another general object of the invention is to provide an improved hybrid inflator having improved treatment of gases therein.

Such a general object of the invention can be attained, at least in part, through an apparatus suitable for use in inflating a vehicle occupant restraint that includes an elongated cylindrical container having a first chamber for storing a gas generating material and a second chamber for storing a supply of gas under pressure and useful in effecting gas redirection. The gas generating material when ignited produces a hot gas which contains particulate of the gas generating material and byproducts thereof. The hot gas is releasable from the second chamber into the first chamber by means of at least one gas exit nozzle.

The second chamber houses a filter placed along the inner wall thereof opposite the gas exit nozzle. The filter is useful in effecting gas redirection and particulate removal, at least in part by means of particulate condensation, from at least a portion of the hot gas released from the first chamber and impinging thereon forming a hot gas having a significantly reduced particulate content, at least a portion of which is mixed with the stored gas in the second chamber forming inflation gas for use in inflating the vehicle occupant restraint.

The apparatus also includes a diffuser having at least one controlling orifice for providing passage therein of at least a portion of the inflation gas from the container. The diffuser also includes at least one exit port for dispensing at least a portion of the inflation gas passing therein into the vehicle occupant restraint and there is at least an approximately 180° cumulative change in gas direction between impinging on the filter and the passage of the inflation gas into the diffuser.

The invention further comprehends a hybrid inflator for an air bag which includes a storage chamber for storing an inflation gas under high pressure, a pyrotechnic heater, an impingement filter material, a first diaphragm, a diffuser, and a second diaphragm.

The storage chamber is formed by a hollow cylindrical sleeve that is closed at one end by a fill plug means and closed at the opposite end by the pyrotechnic heater. The pyrotechnic heater is recessed into the sleeve and includes a combustion chamber having a pyrotechnic charge therein, a nozzle orifice, and a solid plug means abutting a shoulder adjacent the nozzle orifice. The impingement filter material is placed on the inner wall of the fill plug means opposite the nozzle orifice of the pyrotechnic heater. The diffuser includes a plurality of orifices for dispensing inflation gas from the storage chamber uniformly into an air bag. The storage chamber is sealed from the diffuser by the second diaphragm and is further sealed from the combustion chamber by the first diaphragm backed up by the solid plug means against the high pressure of the inflation gas stored in the storage chamber. As the pressure in the combustion chamber rises and, upon ignition of the pyrotechnic charge, exceeds the pressure of the stored inflation gas in the storage chamber, the solid plug is unseated with the first diaphragm subsequently rupturing when the pressure in the combustion chamber exceeds the pressure in the storage chamber. Thus, the hot gas from the burning pyrotechnic charge heats the stored inflation gas in the storage chamber causing a rapid rise of pressure therein. When the pressure in the storage chamber exceeds the structural capability of the second diaphragm, rupture of the latter occurs allowing the heated gas to vent through the diffuser orifices in an air bag. This inflator includes an impingement filter material placed on the inner wall of the fill plug means opposite the nozzle orifice of the pyrotechnic heater.

The invention also comprehends a method for producing inflation gas suitable for use in inflating a vehicle occupant restraint. The apparatus used in such production includes a container having a first chamber for storing a gas generating material and a second chamber useful in effecting gas redirection. The method includes igniting the gas generating material stored in the first chamber to produce a hot gas, which hot gas contains particulate of the gas generating material and byproducts thereof. Hot gas is released from the first chamber into the second chamber by means of at least one gas exit nozzle. Gas redirection and particulate removal from at least a portion of the hot gas released from the first chamber is effected by means of a filter placed along the inner wall of the second chamber opposite the gas exit nozzle. The hot gas, having a significantly reduced particulate content, forms an inflation gas for use in inflating the vehicle occupant restraint. The inflation gas is passed by means of a diffuser having at least one controlling orifice for providing passage therein of at least a portion of the inflation gas and at least one exit port for dispensing at least a portion of the inflation gas passing therein into the vehicle occupant restraint. In such a method there is at least an approximately 180° cumulative change in gas direction between the gas initially contacting the filter and the passage of the inflation gas into the diffuser.

As used herein, the phrase "thrust neutral" refers to the production by an inflator of zero thrust when initiated as, for example, during a deployment event or accidentally during shipping, storage or handling thereof. That is to say, the gas discharge openings in the inflator are so positioned that the gas is discharged in opposing directions whereby there are no resulting forces tending to cause physical movement of the inflator. Hence, the inflator will expend the energy generated thereby, generally in place.

References herein to "knitted metals" are to be understood to refer to metal wire knitted into a mesh structure of varying density (i.e., openings/inch, typically numbering 48, 76, 100 and 130 openings/inch) and which can be compressed into selected shapes or forms. Such knitted metals are sold by the Metex Corporation of Edison, N.J. Metex Corporation product literature refers to the knitting producing a matrix of interlocking loops that can move relative to each other without permanent distortion. Further, if not distorted beyond its yield point, the knitted material is identified as resuming its original shape when the stress is removed and that even when compressed into a special shape a high degree of resiliency is retained. The literature discloses that knitted metals can generally be made from various materials that can be drawn into a wire form.

The term "percent density" as used herein in reference to knitted metals is to be understood to refer to the degree of compression given to a knitted mesh in the manufacture of a filter formed from the mesh. That is, "percent density" describes the proportion of the volume of the metal relative to the total volume of the unit after compression, usually expressed as a percentage of the volume of the unit.

The term "significantly reduced" and the like as used herein in reference to the particulate content of the gas or gases treated in the subject invention (e.g., the hot gas released from the gas generating material storage chamber and impinging onto the filter) means the removal of at least about 20% to about 80% and generally the removal of at least about 50% of the airborne particulate from such a particulate-containing gas. Such reduced particulate content gas can then be used in the formation of inflation gas which satisfies the maximum allowable airborne particulate content for the inflation gas used in such inflatable restraint systems.

Other objects and advantages will be apparent to those skilled in the art from the following detailed description taken in conjunction with the appended claims and drawings.

BRIEF DESCRIPTION OF THE DRAWINGS

With this description of the invention, a detailed description follows with reference being made to the accompanying figures which form part of the specification and of which:

FIGS. 18A and 18B illustrate a pronged orifice plate.

DETAILED DESCRIPTION OF THE INVENTION

Figure 1:
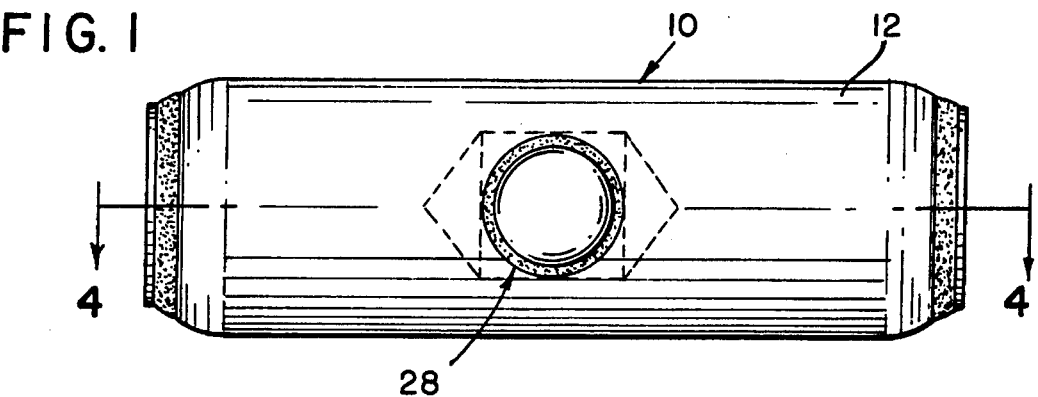
FIG. 1, 2 and 3 are front, side and end views, respectively, illustrating a hybrid inflator in accordance with one embodiment of the present invention.

Referring to FIGS. 1–6, there is shown a hybrid inflator assembly 10 for inflating a vehicle occupant restraint such as an air bag. The inflator assembly 10 comprises a pressure vessel 12 including a storage chamber 14 that is filled and pressurized with an inert gas such as argon or nitrogen to a pressure typically in the range of 2000–4000 psi.

The chamber 14 is defined by an elongated cylindrical sleeve 16. A fill plug 18 is attached by a circumferential weld 20 in sealing relation to a first end 22 of sleeve 16. A pyrotechnic heater 24 is recessed in sealing relation into chamber 14 from a second end 26 of sleeve 16. A diffuser 28 extends at substantially a 90° angle from the exterior surface 30 of sleeve 16 at a location intermediate to the ends 22 and 26 thereof. Diffuser 28 is arranged in sealing relation with sleeve 16 and provides and a passage for the flow of gas from pressure chamber 14 through one or more normally closed constricting orifices 32 that are provided in the wall of sleeve 16.

Figure 4:
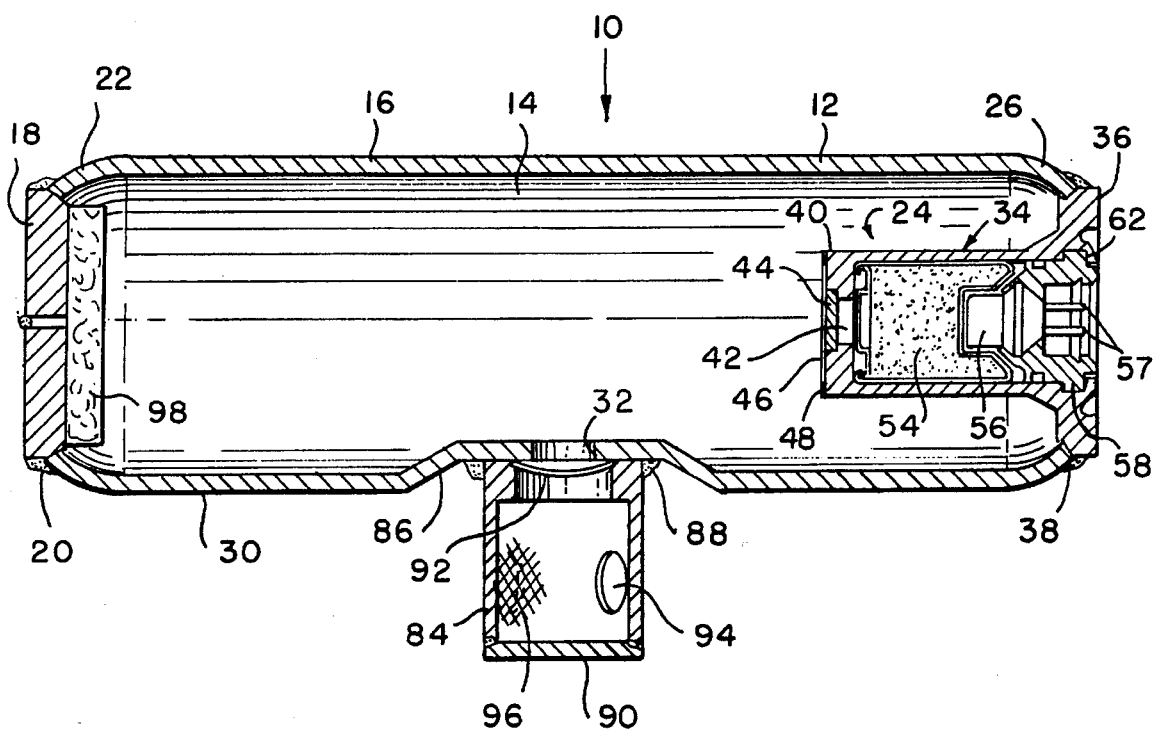
FIG. 4 is a cross sectional view of the hybrid inflator shown in FIGS. 1, 2 and 3 and taken along the lines 4—4 of FIG. 1.
Figure 5:
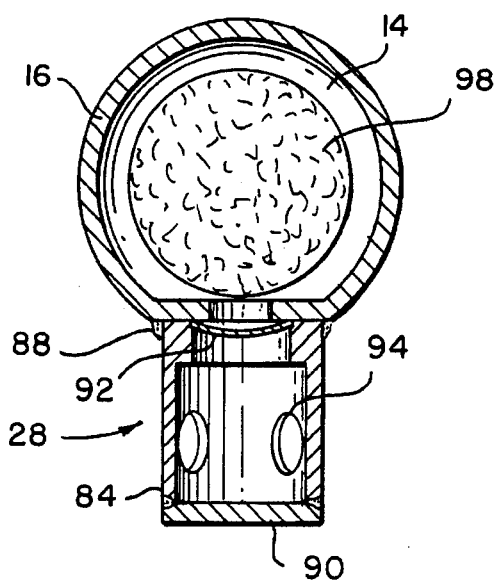
FIG. 5 is a cross sectional view of the hybrid inflator shown in FIGS. 1, 2 and 3 and taken along the lines 5—5 of FIG. 2.
Figure 6:
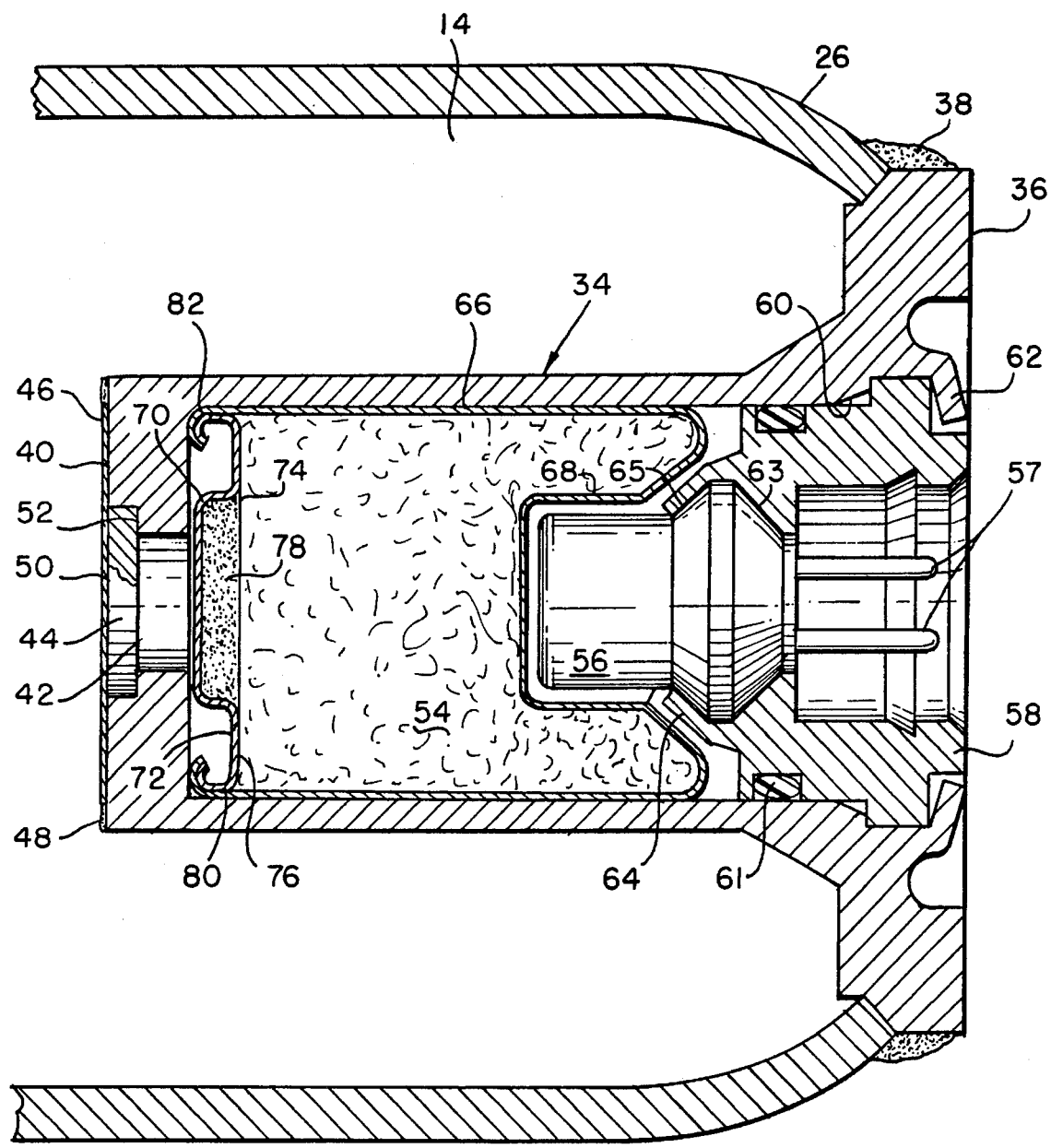
FIG. 6 is an enlarged fragmentary sectional view of a portion of the hybrid inflator sectional view shown in FIG. 4.

The pyrotechnic heater 24 comprises a housing 34 having an enlarged outer end 36 that mates with the second end 26 of sleeve 16. The sleeve 16 and the outer end of 36 of housing 34 are joined in sealing relation at a circumferential weld 38. At the inner end 40 of housing 34 a central opening or nozzle orifice 42 is provided. Orifice 42 is normally covered by a solid metal plug 44 and a thin metal diaphragm 46, referred to hereinafter as a first diaphragm. The diaphragm 46 is joined by a circumferential weld 48 at the periphery thereof in sealing relation to the inner end 40 of housing 34. The plug 44 provides back up support for the thin diaphragm 46 over the entire area thereof, thus enabling the thin diaphragm 46 to withstand the loads of the high pressure gas stored in chamber 14. To that end, the surface 50 of plug 44 adjacent the diaphragm 46, as seen in FIGS. 4 and 6, is made to be flush with the inner end 40 of housing 34, with the plug 44 abutting a shoulder 52 adjacent nozzle orifice 42.

Contained with the pyrotechnic housing 34 is a pyrotechnic charge 54 of a granular mixture of $BKNO_3$ and an initiator 56. Initiator 56 is retained within housing 34 by a hollow generally cylindrical mounting adapter 58. Mounting adapter 58 is located in an opening 60 in a central location in the outer end 36 of housing 34, being sealed therein by an O-ring seal 61. A circumferential crimp 62 formed in the other end of 36 of housing 34 securely retains the mounting adapter 58 in opening 60. Electrical contact pins 57 connect initiator 56 to collision sensor means (not shown).

Initiator 56 has a conically shaped portion 63 in engagement with and matching a similarly shaped conical portion provided in the mounting adapter 58. Another portion of the mounting adapter 58 forms a crimp 64 over a reversed conical portion 65 of the initiator 56 thus retaining the latter securely within the opening 60.

Pyrotechnic charge 54 is contained within a generally cylindrical container 66, having a closed reentrant portion 68 into which the initiator 56 fits in close but non-contacting relation. The other end of container 66 is closed by a hat shaped container 70. Container 70 includes a relatively wide brim 72 at the open end thereof that is sealed with an aluminum foil seal 74. Adhesive 76 may be provided for attaching seal 74 to the brim 72.

Container 70 contains an igniter material 78. For facilitating the insertion of container 70 into the open end of container 65 and for effecting a close engagement with the inner wall surface of the latter, the outer peripheral edge of the brim 72 desirably is rounded, as best seen in FIG. 6. Sealing between the containers 66 and 70 may be effected by a suitable sealant 80 such as silicone rubber properly cured in known manner. Desirably, the edge 82 of the open end of container 66 may be rounded inwardly, as shown, to conform to the shape of the inner wall of the pyrotechnic housing 34 with the surface of container 70 remote from foil seal 74 in good thermal contact with the inner end wall of housing 34 and the adjacent end of plug 44.

Although various pyrotechnic materials may be employed for pyrotechnic charge 54 in container 66, a preferred material is a granular mixture of 25% by weight of boron and 75% of potassium nitrate. This mixture has been found to burn with hot flame that is suitable for heating the stored gas with chamber 16 according to the invention.

The igniter material 78 in container 70 may be any granule powder or other material which is stable for long periods at temperatures up to 250° F. (121° C.), will auto ignite at the desired temperature of approximately 350° F. (177° C.), and provide a hot gas effluent output sufficient to ignite the pyrotechnic charge 54 within container 66. An igniter material 78 that has been found to be satisfactory is DuPont IMR 3031, a product of E. I. DuPont de Nemours & Co., Inc. of Wilmington, Del. Stability over long periods is needed because of the expected longevity of use, which may be ten (10) years or more of the vehicle in which the hybrid inflator 10 is installed.

The material of the housing of container 66 may be 0.010 to 0.020 inch (0.0254 to 0.0508 cm) aluminum or steel foil. Adhesive 76 must have high temperature adhesive properties up to the temperature of auto ignition.

The purpose of container 66 and the igniter material 78 contained therein is to rapidly ignite the inflator 10 once the auto ignition temperature of the granules of the igniter material 78 is reached. This result is facilitated through the arrangement of the igniter material 78 in intimate or close thermal contact with the wall of the pyrotechnic housing 34, with the hot gaseous output thereof, upon auto ignition, being directed into the pyrotechnic charge 54 in container 66.

Diffuser 28 comprises a generally cylindrical sleeve 84 that is joined at one end to the sleeve 16, at a depressed portion 86 of the surface 30 in which the orifice 32 is provided, by a circumferential weld 88. The other end of sleeve 84 is joined to and sealed by a gas impervious closure plate 90. A thin metal diaphragm 92, referred to hereinafter as a second diaphragm, provides a seal for orifice 32 in the wall of sleeve 16 which defines storage chamber 14. Provided in sleeve 84 of diffuser 28 are a plurality of orifices 94 for dispensing inflating gas uniformly from chamber 14 into an air bag assembly (not shown).

A coarse screen or perforated metal sheet indicated at 96 is provided in the diffuser 28 to cover thee diffuser orifices 94 to prevent fragments of the diaphragms from entering the air bag assembly. If filtering is desired, the coarse screen 96 could be replaced with a filter assembly of wraps of metal and/or ceramic fiber materials which are common in the art.

As will be described in further detail below, further filtering is achieved by placing impingement filter material indicated at 98 on the inside surface of the fill port end plug 18 opposite the central opening 42 or nozzle of the pyrotechnic heater 24, in accordance with another aspect of the invention. Filter 98 would be made with woven or matted metal and/or ceramic fibers which functions by providing a large surface area upon which liquid phase particulate entrained in the impinging gases may condense and/or onto which particualte may become entrapped.

If required, a pressure monitoring device (not shown) may be included on the fill port end plug 18.

In the operation of the hybrid gas generator, upon receiving an electric signal indicative of the onset of a crash, that is a need for inflation of the air bag, the initiator 56 in the pyrotechnic heater 24 fires, igniting the pyrotechnic charge 54. As the pressure in the combustion chamber contained within container 66 rises and exceeds the high pressure of the stored gas in chamber 14, the plug 44 closing the central orifice 42 in the pyrotechnic housing 34 is unseated. Subsequently, the thin diaphragm 46 ruptures since it is unsupported when the combustion pressure of the pyrotechnic heater 24 exceeds the gas storage pressure in chamber 14. Hot gas and particulate from the burning pyrotechnic charge 54 heat the stored gas causing a rapid pressure rise in the storage chamber. When the storage pressure exceeds the structural capability of the thin metal diaphragm 92 in the diffuser 28, it ruptures allowing the heated gas to vent through the diffuser orifices 94 into the air bag assembly. Between the diffuser diaphragm 92 and the storage chamber 14 are one or more constricting orifices 32 which throttle the flow of gas from the storage chamber 14, providing the proper fill rate to the air bag. The coarse screen or perforated metal sheet 96 prevents fragments of the diaphragms 46 and 92 from entering the air bag assembly. Impingement filter 98 on the fill port end plug 18 provides further filtering by condensing thereon liquid phase particles entrained in the impinging gases as well as entrapping particulate therefrom.

Figure 7:
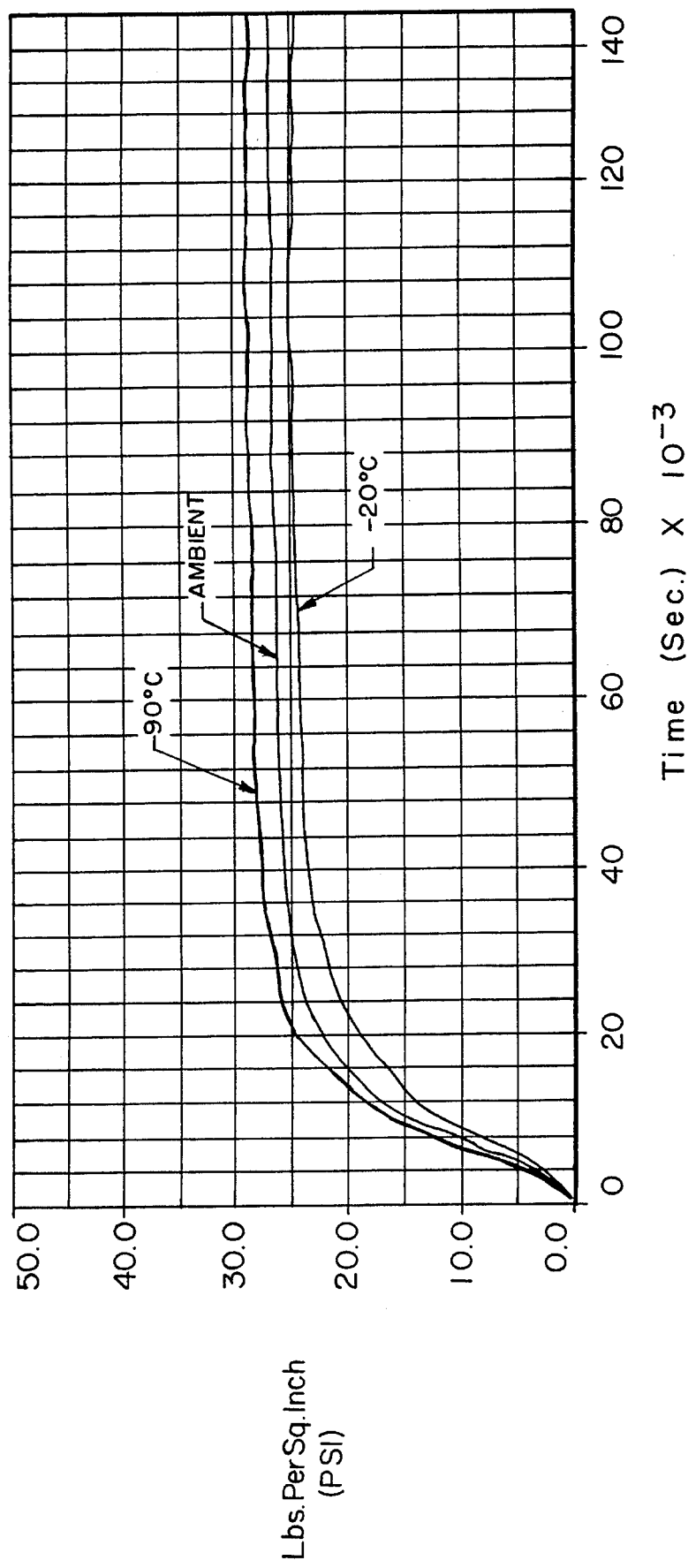
FIG. 7 shows hot, ambient and cold tank performances of the hybrid inflator shown in FIGS. 1, 2 and 3.

FIG. 7 illustrates hot, ambient and cold tank performances of the hybrid inflator 10.

Figure 8:
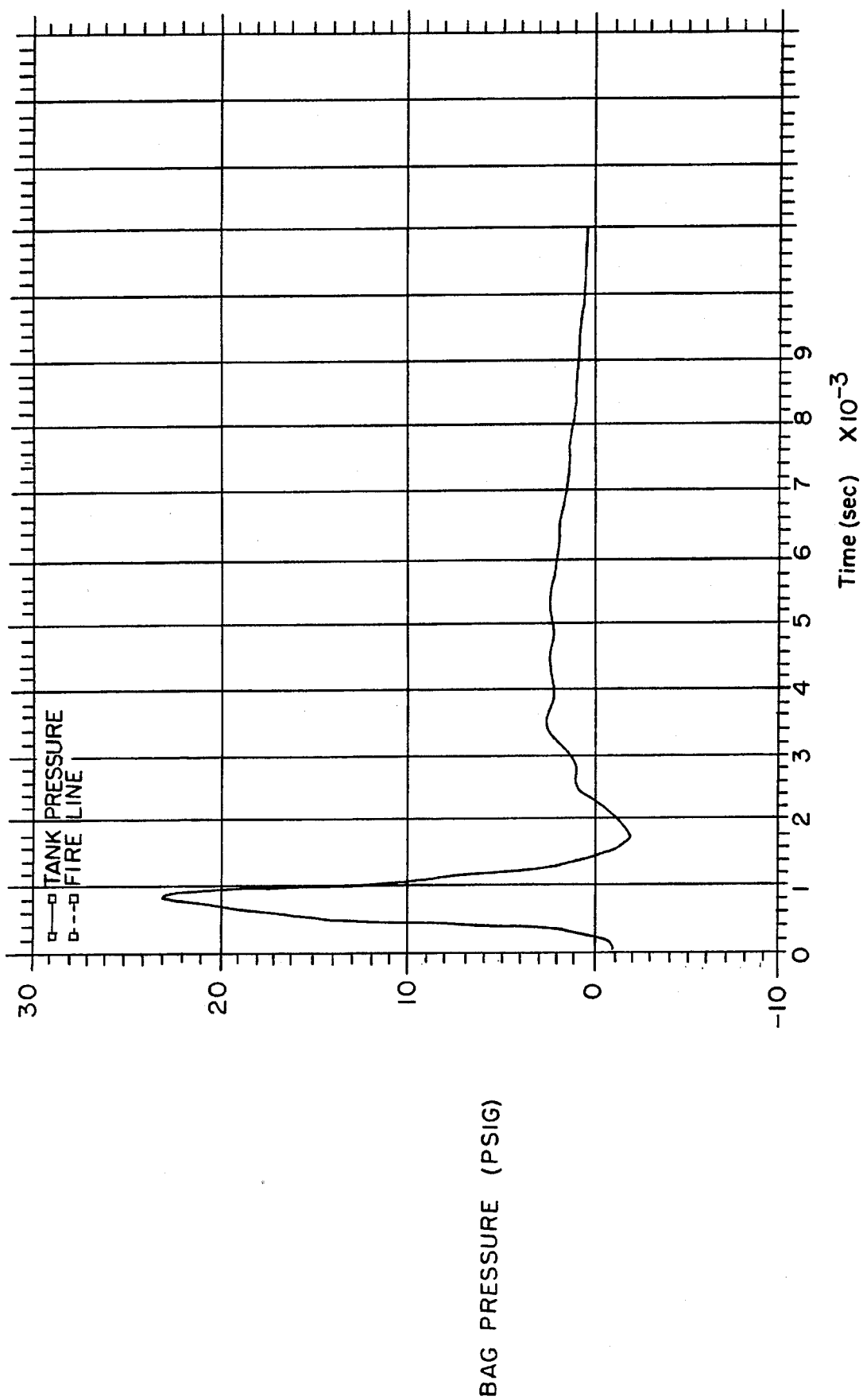
FIG. 8 shows an ambient air bag deployment pressure trace of the hybrid inflator shown in FIGS. 1, 2 and 3.

FIG. 8 shows an ambient air bag deployment pressure trace of the hybrid inflator 10.

Figure 9:
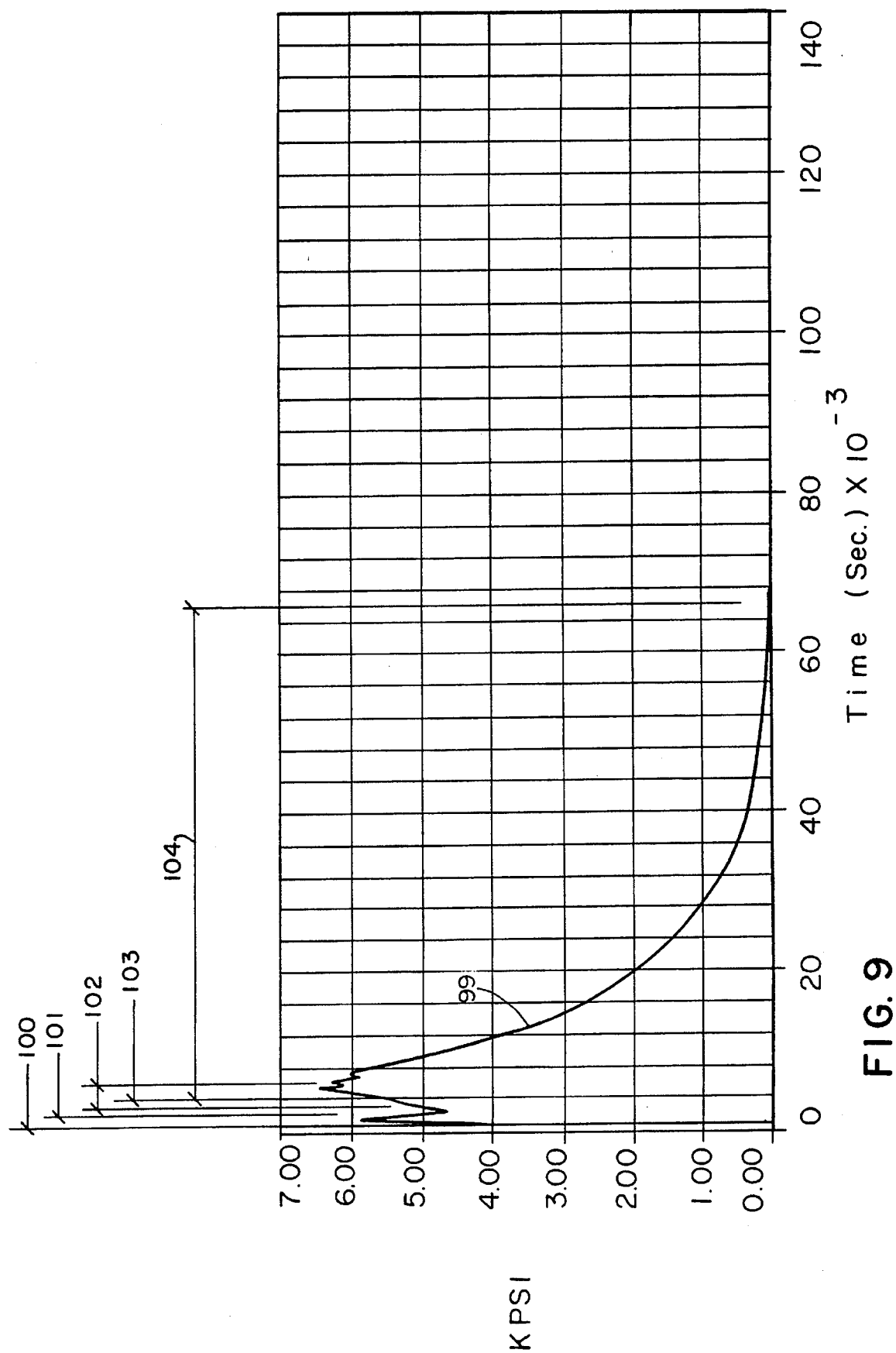
FIG. 9 shows an ambient combustion pressure trace of the hybrid inflator shown in FIGS. 1, 2 and 3.

FIG. 9 shows an ambient combustion pressure trace of the hybrid inflator 10.

In FIG. 9, position 100 on the trace 99 indicates that the ignition signal has been received and that the initiator has fired. Reference numeral 101 shows that the combustion pressure in pyrotechnic heater 24 exceeds the stored gas pressure. Numeral 102 shows the heating period of the stored gas in the storage chamber 14. Numeral 103 indicates that the second diaphragm 92 has ruptured, releasing the heated gas in storage chamber 14. Numeral 104 indicates the period of gas venting from chamber 14.

Thus, in accordance with the invention, there has been provided an improved hybrid inflator that does not require glass-to-metal seals or other complex sealing methods to maintain the high pressure seal of the compressed inert gas storage chamber. Nor does such an improved hybrid inflator require an actuation means (mechanical or pyrotechnic) to open the flow passages from the compressed gas storage chamber to the air bag. Such an improved hybrid inflator of the invention, moreover, is characterized in dispensing, in its entirety, heated gas to the air bag. Additionally, such an improved hybrid inflator features a centrally located diffuser that provides for easier packaging in modules compared to end diffusers typically used on hybrid inflators.

As described above, one aspect of the invention involves the placement of a filter internal to an inflator. The filter is useful in significantly reducing the particulate content of the hot gas formed in such inflators and thus the filter is useful in the formation of an inflation gas of suitable particulate content for use in inflating a vehicle occupant restraint.

Figure 10:
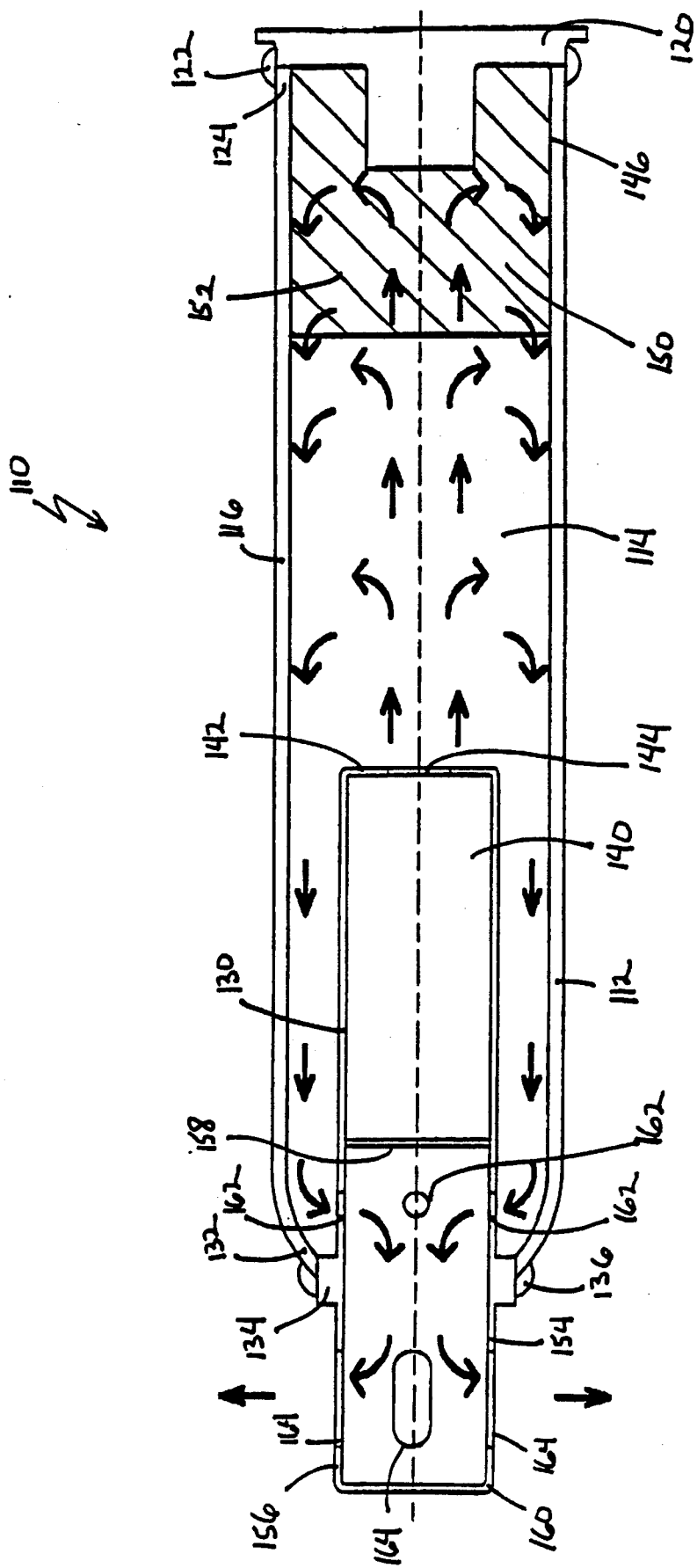
FIG. 10 is a simplified, partially in section schematic drawing of a hybrid inflator in accordance with an alternative embodiment of the invention.

Referring to FIG. 10, a hybrid inflator assembly, generally designated 110, for use in inflating a vehicle inflatable restraint cushion for the passenger side of a vehicle is shown. While the invention will be described below with reference to a passenger side assembly for automotive vehicles including vans, pick-up trucks and particularly automobiles, it is to be understood that the invention also has applicability with other types or kinds of such assemblies including driver side assemblies.

With respect to such automotive vehicles it will be appreciated that due to usual physical differences between passenger and driver side assemblies, for example, passenger side air bags generally are comparatively larger than those used in driver side assemblies and thus such passenger side assemblies typically require a comparatively larger volume of inflating gas, the invention has particular utility in passenger side assemblies.

As shown in FIG. 10, the inflator assembly 110 includes an elongated, generally cylindrically shaped pressure vessel or container 112. It will be appreciated, however, that if desired variously sized and shaped containers including, for example, those having a cylindrical, toroidal, spherical or selected intermediary shape can be used in the practice of the invention.

The container 112 includes a storage chamber 114 useful in effecting gas redirection and for use in storing a supply of gas under pressure. For example, as described above, an inert gas such as argon or nitrogen at a pressure typically in the range of 2000–4000 psi can be used to fill and pressurize the inflator chamber. It is to be understood, however, that the container 112 could be used to store other selected gases (for example, carbon dioxide, air, other inert gases or one or more combinations of such gases) and/or gases at other storage pressures, as desired.

The chamber 114 is defined by an elongated cylindrical sleeve 116. An end plug 120 is attached by means of a circumferential weld 122 in sealing relation to a first end 124 of the sleeve 116. The end plug 120 includes a passage (not shown) through which the gas can be conducted into the chamber 114. Once the chamber 114 has been filled with gas at the desired pressure, the passage is closed. The end plug 120, either separately or as an integral part thereof, includes a conventional pressure switch (not shown), commonly referred to as a low pressure sensor ("LPS"), from which gas pressure in the chamber 114 can be monitored to alert the vehicle occupant should the chamber pressure drop below a predetermined pressure.

A gas generator housing 130 is recessed in sealing relation into the chamber 114 from a second end 132 of the sleeve 116, with a collar 134 about the mid-section of the gas generator housing 130 being attached by means of a circumferential weld 136 with the sleeve 116.

A gas generator housing 130 includes a chamber 140 for use in storing therein a supply of gas generating material, for example, a pyrotechnic charge such as a granular mixture of $BKNO_3$ or extrudable solid propellants such as combinations of binders, used as a fuel, with solid oxidizers such as a combination of polyvinyl chloride (fuel) with potassium nitrate or potassium perchlorate (oxidizer), for example.

The chamber 140 includes an inner end 142 having a central opening or nozzle orifice 144 wherethrough hot gas produced upon ignition of the gas generating material is released into the chamber 114. It is to be understood, however, that the number, positioning and shape of such nozzle orifice or orifices can be appropriately altered to satisfy design requirements for particular installations as will be apparent to those skilled in the art.

The hot gas typically contains particulate of the gas generating material and byproducts thereof. The nature of such particulate material will at least in part be dependent on the nature of the gas generating material itself. Thus, for $BKNO_3$, typical particulate is in the nature of boron and/or potassium compounds.

Within the chamber 114, along the inner wall 146 at the first end 124, about the end plug 120 and opposite the nozzle orifice 144, is housed a filter structure, shown schematically as reference numeral 150, composed of a filter material of knitted metal wire of selected diameter and percent density, shown schematically as reference numeral 152. For example, a knitted stainless steel wire of 0.020" diameter and a percent density preferably in the range of 10 to 50 percent has been found effective. Such a knitted stainless steel wire filter structure 150 is pressure molded or compression formed into the desired shape to fit within the end 124 of the inflator assembly 110 opposite the nozzle orifice 144, such end with or without an LPS.

The material used in the filter structure 150 preferably is generally resistant to the high temperatures associated with the solids and gases produced upon ignition of the gas generating material. Moreover, as the filter structure of the invention is housed within the gas mixing chamber of the hybrid inflator and whereat the gas velocity is preferably relatively low, as the so placed filter structure is generally subjected to less onerous operating conditions. Partially as a result thereof, the practice of the invention facilitates the effective use of a relatively wide variety of filter materials or mediums in the filter structure of the invention. For example, the filter structure can, if desired, be composed of one or a combination of filter materials including: ceramic paper such as LYTHERM (a trademark of Lydall Inc.), ceramic textile such as KAO-TEX (a trademark of Thermal Ceramics Inc.), metallic woven stainless steel such as by National Standard Co., knitted stainless steel such as by Metex Corporation, sintered non-woven metallic mat such as of stainless steel by Memtec America Co. as well as reticulated ceramic or metallic ceramic vapor deposition foams such as of silica-carbide.

With respect to the filter structures of the invention, such as those comprising such metallic woven or knitted metal filter materials, appropriate design parameters such as type of metal, thickness of the metal wire, percent density and form of the filter structure are readily discernable and selected by one skilled in the art and guided by the teachings herein in order to satisfy installation specifics, such as the nature of the specific pyrotechnic being utilized, without any undue experimentation.

The filter structure 150 effects gas redirection and particulate removal within the chamber 114 from at least a portion of the hot gas released from the chamber 140 into the chamber 114 and impinging thereon. That is, the filter structure 150 forms a filter body onto which the particulate-containing hot gas impinges with at least a portion of the hot gas generally progressing into the filter body of the filter structure 150. The filter structure 150 thereby can effect gas redirection and particulate removal of and from the particulate-containing hot gas, In practice and as will be described in greater detail below, such particulate removal is typically in the nature of condensation of liquid phase particulate and/or entrapment of particulate on the filter.

As a result of the particulate removal, the filter structure 150 forms a hot gas having a significantly reduced particulate content, at least a portion of which in turn mixes with the gas stored in the chamber 114 to form inflation gas for use in inflating the vehicle occupant restraint.

In the embodiment illustrated in FIG. 10, the gas generator housing 130 includes an inflator diffuser 154, adjacent to and integral with the pyrotechnic storage chamber 140. That is, the diffuser 154 comprises a generally cylindrical sleeve 156 that is joined at a first end 158 to the pyrotechnic storage chamber 140. An opposite second end 160 of the diffuser 154 extends external the container 112. Four generally equally spaced controlling orifices 162 are positioned about the cylindrical sleeve 156, adjacent the first end 158. The controlling orifices 162 provide passage into the diffuser 154 of inflation gas from the container 112. This inflation gas can then exit the inflation apparatus, i.e., the inflator apparatus 110, by means of gas exit ports 164 spaced about adjacent the second end 160 of the diffuser 154.

In the illustrated apparatus, four generally oval shaped gas exit ports 164 are spaced about the diffuser end 160. The four gas exit ports 164 are generally equally spaced at about 90° about the circumference of the diffuser end 160 so as to promote a more uniform distribution of the exiting gas about the circumference of the inflator assembly 110 and to desirably result in the assembly being thrust neutral. It is to be understood, however, that the number, spacing and shaping of the gas exit ports can be appropriately altered to satisfy design requirements for particular installations as will be apparent to those skilled in the art.

It will be appreciated that in the embodiment illustrated in FIG. 10, the gas initially exiting from the pyrotechnic chamber 140 will be generally directed towards the end plug 120 and the filter structure 150 placed thereat. However, the controlling orifices 162 are positioned near or adjacent the end 132, opposite the end 124 at which the filter structure 150 is located. Thus, the gas released from the chamber 140 and contacting the filter structure 150 will undergo at least an approximately 180° cumulative change in gas direction between its impingement onto the filter structure 150 and subsequent passage through the diffuser 154.

In the general practice of the invention, it has been found that more efficient filtration of particulate from the gas generant-produced gas has been obtained when the filter is placed at a location where gas velocities are minimized, for example, where there is flow direction reversal. It is theorized that condensation of particulate, wherein heat removal results in a phase change and resultant condensation of particulate on available filter surface area, is facilitated when the particulate-containing gas being filtered contacts the filter material at low velocity. Additional particulate removal can be effected by means of particulate entrapment within the filter whereby particulate (solid) is physically separated from the medium (gas).

It is additionally noted that the filter device of the invention results in a significant reduction in the particulate content of the treated gases, such as through condensation and/or entrainment, whereby at least about 20% to about 80% and generally at least about 50% of the airborne particulate content thereof is removed without off-gassing such as would normally be associated with the use of various organic and inorganic coatings. Furthermore, the filter device of the inventions can be rigidly secured in place without its stability being affected by normal operating conditions, for example, temperatures and flows.

The filter structure of the invention serves to reduce the amount of particulate expelled from the hybrid inflator. Further, such reduction in particulate content is not limited to the removal of relatively large particulates. As a result, inflator emission toxicity and particulate limits can be desirably satisfied.

In the embodiment illustrated in FIG. 10, the filter structure 150 is spot welded to the plug 120 or otherwise appropriately positioned and placed within the inflator assembly 110.

It is also noted that while the aspect of the invention involving a filter internal to the inflator has been described herein in reference to a hybrid inflator, it is to be understood that the invention can also be utilized with other inflators having similar flow characteristics, for example, inflators having substantially unidirectional flow of gas from a gas generator chamber with a reversal of the flow of such gas (for example, a cumulative change in gas flow direction of at least approximately 180° between contacting the filter and the passage of the inflation gas into the diffuser). For example, if desired, the invention can be applied to pyrotechnic inflators having a pyrotechnic chamber (similar to the chamber 140, shown in FIG. 10) and a filter-containing chamber (similar to the chamber 114, shown in FIG. 10 and here used in gas redirection but not in the storage of a pressurized, principal supply of gas for use in the inflation of the vehicle occupant restraint).

The foregoing detailed description is given for clearness of understanding only, and no unnecessary limitations are to be understood therefrom, as modifications within the scope of the invention will be obvious to those skilled in the art.

Figure 11:
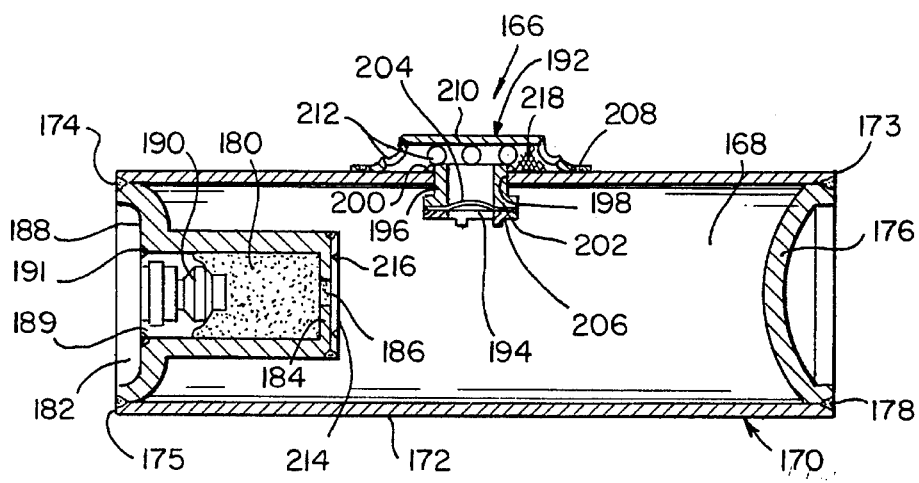
FIG. 11 is a cross sectional view of another embodiment of the hybrid inflator in accordance with the invention and includes a stamped end plug that is welded to the cylindrical inert gas storage chamber.
Figure 12:
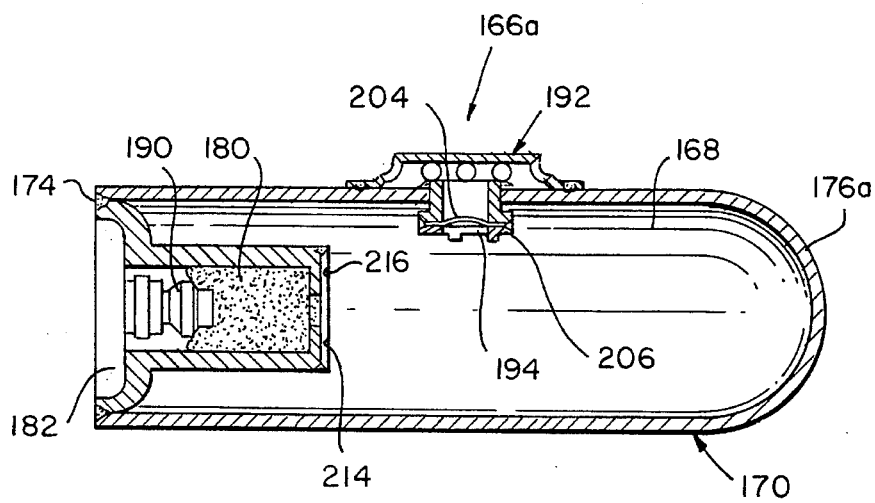
FIG. 12 is a cross sectional view of still another embodiment of the hybrid inflator in accordance with the invention and includes an end plug that eliminates a bulkhead weld because the end plug is integral with, that is, formed in one piece with, the cylindrical inert gas storage chamber.

In FIGS. 11 and 12 there are shown other embodiments, according to the present invention, of a hybrid gas generator or inflator for use in air bag inflatable restraint systems. Each of these embodiments has a chamber 170 for storing inert gas under high pressure (for example, argon or nitrogen at 2000 to 4000 psi), a chamber 180 for storing pyrotechnic material (for example, a granular mixture of boron potassium nitrate ($BKNO_3$) or other suitable pyrotechnic material to heat the stored gas), a diffuser 192 which contains gas orifices for dispensing gas uniformly into the air bag assembly, a thin metal diaphragm 204 to provide a pressure seal between the storage chamber 170 and the diffuser 192, and a metal disk 214 that is scored with a circular groove 216 to seal the pyrotechnic material from the stored gas 168.

In the gas generator 166 shown in FIG. 11, the chamber 170 for storing an inert gas 168 is cylindrically shaped. The storage chamber 170 is defined by an elongated hollow cylindrical sleeve 172. Attached to one end 173 of the sleeve 172 is a stamped end plug 176 that is welded thereto by a circumferential weld 178. Welded by a circumferential weld 174 to the other end 175 of the cylindrical sleeve 172 is the pyrotechnic storage chamber 180 of a pyrotechnic heater 182 which is recessed or submerged in the gas storage area in chamber 170.

The chamber 180 of the pyrotechnic heater 182 for storing the pyrotechnic material is a metal stamping that has an opening in one end 184 for a nozzle orifice 186 through which the burning pyrotechnic flows and an opening 188 in the opposite end into which an initiator or squib 190 is attached. The metal stamping for pyrotechnic heater 182 minimizes the amount of material required to ensure adequate strength and thereby reduces the weight and cost thereof.

Squib 190 is maintained within the pyrotechnic storage chamber 180 a hollow generally cylindrical mounting adapter 189. The mounting adapter is centrally located in opening 188 of the pyrotechnic heater 182 and is secured therein by a circumferential weld 191.

Diffuser 192, comprising a metal stamping, is of reduced height, includes a controlling orifice 194, and is attached to the storage chamber 170 at the center of the cylindrical sleeve 172. The controlling orifice 194 of the diffuser 192 is formed by a generally cylindrical sleeve 196. The sleeve 196 is inserted through a circular opening 198 in the wall of the cylindrical sleeve 172 and is attached at one end thereto by a circumferential weld 200. At the other end thereof the sleeve 196 includes an outwardly directed flange 202. Within the diffuser 192 is the thin metal diaphragm 204 which seals the controlling orifice 194 and ruptures during deployment. The diaphragm 204 is attached to the flanged end of the sleeve 196 by an orifice plate 206. The assembly of the diaphragm 204 and the controlling orifice 194 is inside the storage chamber. This allows the height of the diffuser 192 externally of the cylindrical sleeve 172 to be substantially reduced.

Centrally positioned on the outside of the cylindrical sleeve 172 over the welded end of the sleeve 196 and attached to the sleeve 172 by a circumferential weld 208 is a circular member 210 having the general shape of an inverted dish. A plurality (for example, eight) of gas exit ports or holes 212 are provided in the short upwardly extending and inwardly sloping wall of the member 210. Thus, diffuser 192 is a perforated diffuser with holes small enough to prevent fragments from passing through to the air bag. Externally of the sleeve 172 of the gas generator 166, the diffuser 192 has a height that is substantially reduced with respect to the height of the gas generator 28 of the invention embodiment illustrated herein in FIGS. 1–5.

Figure 17:
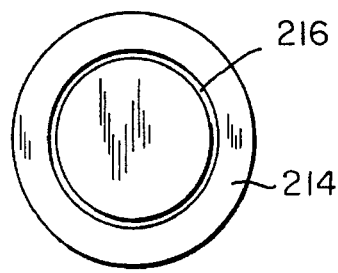
FIG. 17 is an illustration of a metal disk with a circular groove.

A metal disk 214, that is scored with a circular groove 216, as illustrated in FIG. 17, is welded around the perimeter thereof to the inner end of the pyrotechnic heater 182 over the nozzle orifice 186. The metal disk 214 is sized to fail at a predetermined pressure differential. The circular groove 216 is located at a diameter that is larger than the nozzle orifice 186 so that it can support pressure from the direction of the gas storage chamber 170 but will rupture once the pressure in the pyrotechnic storage chamber 180 exceeds the pressure in the gas storage chamber 170 by a predetermined pressure differential.

Figure 16:
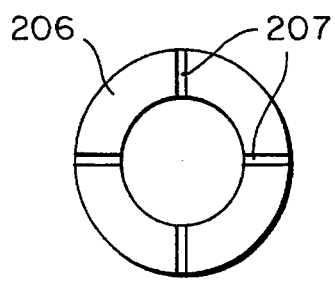
FIG. 16A and 16B are an illustration of a dimpled orifice plate.

In order to assure that the controlling orifice 194 in the diffuser 192 is not plugged by the scored thin metal disk 214 during operation of the gas generator or inflator 166, a dimpled or pronged orifice plate 206 is provided for reliability. The orifice plate 206, as shown in FIGS. 11 and 12, is a pronged orifice plate. The plate 206 can also be of a dimpled configuration, as shown in FIG. 16, with depressions 207 in the surface thereof to prevent plugging during inflator operation.

Figure 13:
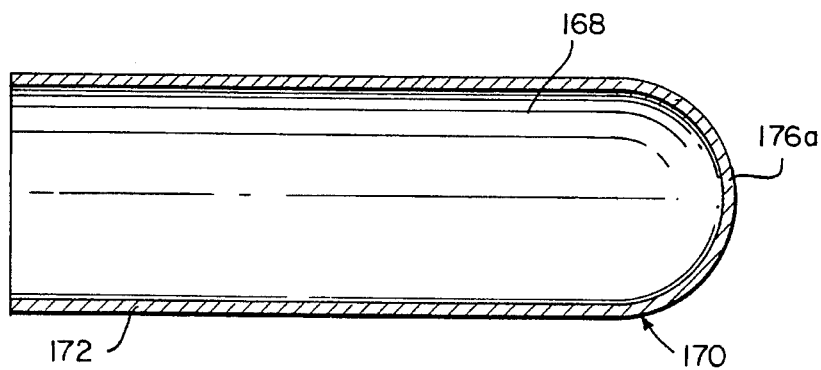
FIG. 13 is a cross sectional view of a cylindrical inert gas storage chamber having an integral end plug made by drawing the cylinder from a flat disk into a tube with only one open end.

The gas generator illustrated in FIG. 12 and designated 166a differs from that shown in FIG. 11 in that the stamped end plug 176 at the end 173 of the cylindrical sleeve 172 and the circumferential weld 178 have been eliminated. In lieu thereof the end plug, designated 176a at the corresponding end of the sleeve 172 in FIG. 12 is made, as illustrated in FIG. 13, from drawing the cylinder from a flat, circular disk into a tube with only one open end. The end plug 176a eliminates a bulkhead weld because the end plug 176a is integral with, that is, formed in one piece with, the sleeve 172 of the gas storage chamber 170.

Figure 14:
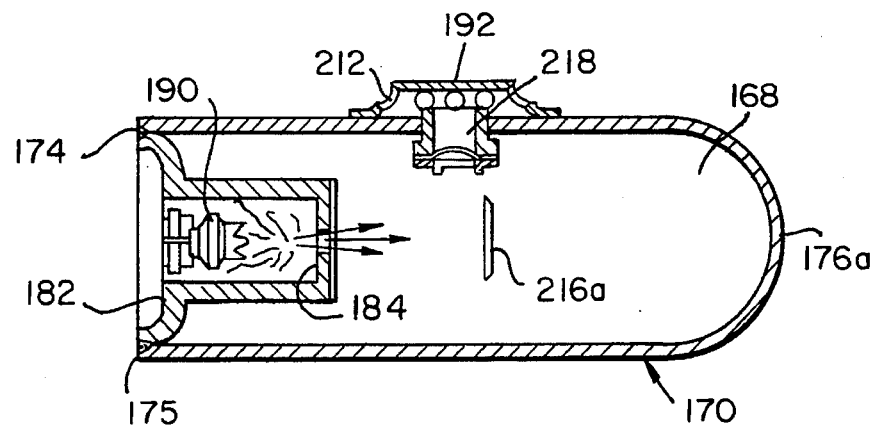
FIG. 14 is a cross sectional view illustrating the operation of a metal disk that is scored with a circular groove and is welded around the perimeter thereof to the nozzle orifice of the chamber in which pyrotechnic material is stored.
Figure 15:
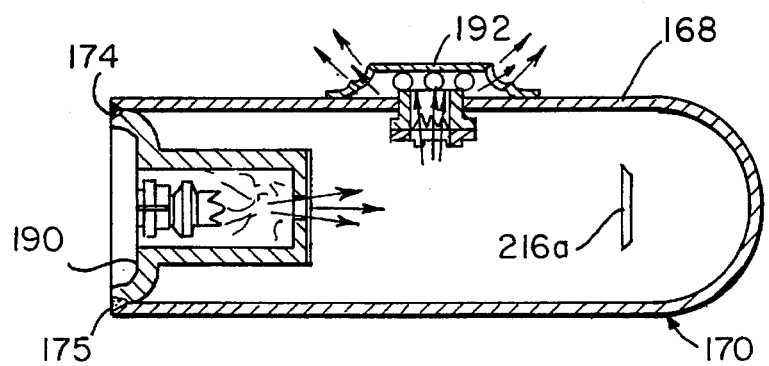
FIG. 15 is a cross sectional view illustrating the operation of the diffuser that is attached to the gas storage chamber at the center of the cylinder.

In the operation of the hybrid gas generator 166 of FIG. 11 and 166a of FIG. 12, upon receiving an electrical signal indicative of an incipient crash or collision and the need for inflation of an air bag (not shown), the initiator or squib 190 fires and ignites the pyrotechnic charge, typically $BNKO_3$, in the pyrotechnic storage chamber 180 of the pyrotechnic heater 182. As the pressure in the storage or combustion chamber 180 rises and exceeds the pressure of the stored inert gas 168 in the storage chamber 170, the metal disk 214 fails at the circular groove 216 and separates at the groove 216. The separated portion, designated 216a, is hurled into the storage chamber 170, as illustrated in FIGS. 14 and 15. Hot gas and particles from the burning pyrotechnic heat the stored inert gas 168 causing a rapid pressure rise in the storage chamber 170. When the pressure in the storage chamber 170 exceeds the structural capability of the thin metal diaphragm 204 in the diffuser 192, the diaphragm 204 ruptures and allows the heated stored inert gas 168 to vent through the diffuser orifices 212 into the air bag assembly, as illustrated in FIG. 15.

Between the diffuser diaphragm 204 and the storage chamber 170 are one or more constricting orifices, which throttle the flow of gas from the storage chamber, providing the proper fill rate to the air bag assembly. A coarse metal screen or perforated metal sheet 218 is included inside the diffuser 192 (or part of the diffuser 192 itself) to cover the diffuser exit orifices 212 and prevent fragments of the diaphragm 204 or of the metal disk 214 from entering the air bag assembly.

Thus, in accordance with the invention, there have been provided a number of improvements in hybrid gas generators. It should be noted, however, that not all of the improvements need to be included in an embodiment of the invention. That is to say, if a particular arrangement is to be used, it may include only one or two of the new features, or it may include all of the new features.

The following is a list of the improvements to hybrid gas generators made in accordance with the invention:

1) Stamped end plug(s) and igniter housing;

2) Stamped diffuser;

3) Diaphragm/orifice assembly inside storage chamber allows for reduced height;

4) Thin metal disk with circular groove simplifies scaling instead of diaphgram/plug assembly;

5) Integral end plug;

6) Dimpled or pronged orifice plate prevents plugging of controlling orifice;

7) Perforated diffuser with holes small enough to prevent fragments (eliminates screen).

None of the hybrid gas generators embodying the invention disclosed herein require glass-to-metal seals or other complex sealing methods to maintain the high pressure seal. Nor do they require an actuation means (mechanical or pyrotechnic) to open the flow passages. Entirely heated gas is dispensed. The central diffuser provides for easier packaging in modules compared to end diffusers typically used on hybrid inflators. Making the parts from stampings reduces the cost and weight of the inflator. The inert gas storage chamber 178 with the integral end plug 176a, that is, an end plug formed in one piece with the chamber, eliminates a weld and improves the reliability of the hybrid inflator. The metal disk 214 with the circular groove 216 eliminates the need for a plug to support a thin metal disk because it can support pressure from the stored gas but will rupture when the pressure in the igniter or combustion chamber 180 exceeds the pressure in the gas storage chamber 170.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. A hybrid inflator for an air bag comprising, a storage chamber for storing inflation gas under high pressure, said storage chamber being formed by a hollow cylindrical sleeve that is closed at one end and open at an opposite end, a pyrotechnic heater closing said opposite end of said sleeve, said pyrotechnic heater being recessed into said sleeve and including a combustion chamber having a pyrotechnic charge therein, a nozzle orifice, and a metal burst member attached around the perimeter thereof to an inner portion of said pyrotechnic heater in closing relation to said nozzle orifice and arranged to support pressure from the direction of said gas storage chamber but not from said combustion chamber of said pyrotechnic heater, a diffuser having a plurality of orifices for dispensing inflation gas from said storage chamber uniformly into an air bag, a diaphragm, and an orifice plate, wherein said diffuser includes a controlling orifice to which said diaphragm is attached in a sealing relation, and wherein said orifice plate is pronged to prevent plugging of said controlling orifice, parts of said storage chamber, said pyrotechnic heater and said diffuser being made from metal stampings instead of machined or forged parts, said storage chamber being sealed from said diffuser by said diaphragm and being further sealed from said combustion chamber by said metal burst member against the high pressure of the inflation gas stored in said storage chamber, whereby as the pressure in the combustion chamber rises and exceeds the pressure of the stored inflation gas in said storage chamber upon ignition of said pyrotechnic charge, said metal burst member ruptures since it is unsupported when the pressure in said combustion chamber exceeds the pressure in said storage chamber, and hot gas from the burning pyrotechnic charge heats the stored inflation gas in said storage chamber causing a rapid pressure rise therein so that when the pressure in said storage chamber exceeds the structural capability of said diaphragm rupture of the latter occurs allowing the heated gas to vent through said diffuser orifices into an air bag.

2. A hybrid inflator for an air bag comprising, a storage chamber for storing inflation gas under high pressure, said storage chamber being formed by a hollow cylindrical sleeve that is closed at one end and open at an opposite end, a pyrotechnic heater closing said opposite end of said sleeve, said pyrotechnic heater being recessed into said sleeve and including a combustion chamber having a pyrotechnic charge therein, a nozzle orifice, and a metal burst member attached around the perimeter thereof to an inner portion of said pyrotechnic heater in closing relation to said nozzle orifice and arranged to support pressure from the direction of said gas storage chamber but not from said combustion chamber of said pyrotechnic heater, a diffuser having a plurality of orifices for dispensing inflation gas from said storage chamber uniformly into an air bag, a diaphragm, and an orifice plate, wherein said diffuser includes a controlling orifice to which said diaphragm is attached in sealing relation, and wherein said orifice plate is dimpled to prevent plugging of the controlling orifice, said metal burst member ruptures since it is unsupported when the pressure in said combustion chamber exceeds the pressure in said storage chamber, and hot gas from the burning pyrotechnic charge heats the stored inflation gas in said storage chamber causing a rapid pressure rise therein so that when the pressure in said storage chamber exceeds the structural capability of said diaphragm rupture of the latter occurs allowing the heated gas to vent through said diffuser orifices into an air bag.

3. A hybrid inflator for an air bag comprising, a storage chamber for storing inflation gas under high pressure, said storage chamber being formed by a hollow cylindrical sleeve that is closed at one end and open at an opposite end, a pyrotechnic heater closing said opposite end of said sleeve, said pyrotechnic heater being recessed into said sleeve and including a combustion chamber having a pyrotechnic charge therein, a nozzle orifice, and a metal burst member attached around the perimeter thereof to an inner portion of said pyrotechnic heater in closing relation to said nozzle orifice and arranged to support pressure from the direction of said gas storage chamber but not from said combustion chamber of said pyrotechnic heater, a diffuser having a plurality of orifices for dispensing inflation gas from said storage chamber uniformly into an air bag, and a diaphragm, parts of said storage chamber, said pyrotechnic heater and said diffuser being made from metal stampings instead of machined or forged parts, said storage chamber being sealed from said diffuser by said diaphragm and being further sealed from said combustion chamber by said metal burst member against the high pressure of the inflation gas stored in said storage chamber, whereby as the pressure in the combustion chamber rises and exceeds the pressure of the stored inflation gas in said storage chamber upon ignition of said pyrotechnic charge said metal burst member ruptures since it is unsupported when the pressure in said combustion chamber exceeds the pressure in said storage chamber, and hot gas from the burning pyrotechnic charge heats the stored inflation gas in said storage chamber causing a rapid pressure rise therein so that when the pressure in said storage chamber exceeds the structural capability of said diaphragm rupture of the latter occurs allowing the heated gas to vent through said diffuser orifices into an air bag, wherein said cylindrical sleeve of said storage chamber is closed at said one end by material that is formed in one piece with said cylindrical sleeve, wherein said diffuser includes a diaphragm/orifice assembly that is located inside said storage chamber and enables said diffuser to have a reduced height externally of said storage chamber, further including an orifice plate, wherein said diffuser includes a controlling orifice to which said diaphragm is attached in a sealing relation, and wherein said orifice plate is pronged to prevent plugging of said controlling orifice, wherein said diffuser is perforated with holes small enough to prevent the passage of fragments of metal therethrough, and wherein said metal burst member comprises a metal disk having a circular groove and which is attached around the perimeter thereof to an inner portion of said pyrotechnic heater in closing relation to said nozzle orifice with said circular groove located at a diameter that is larger than said nozzle orifice so that said metal disk can support pressure from the direction of said gas storage chamber but is unsupported and ruptures when the pressure in said combustion chamber exceeds the pressure in said storage chamber.

4. A hybrid inflator for an air bag comprising, a storage chamber for storing inflation gas under high pressure, said storage chamber being formed by a hollow cylindrical sleeve that is closed at one end and open at an opposite end, a pyrotechnic heater closing said opposite end of said sleeve, said pyrotechnic heater being recessed into said sleeve and including a combustion chamber having a pyrotechnic charge therein, a nozzle orifice, and a metal disk scored with a circular groove and attached around the perimeter thereof to an inner portion of said pyrotechnic heater in closing relation to said nozzle orifice with said circular groove located at a diameter that is larger than said nozzle orifice so that said metal disk can support pressure from the direction of said gas storage chamber, a diffuser having a plurality of orifices for dispensing inflation gas from said storage chamber uniformly into an air bag, a diaphragm, and an orifice wherein said diffuser includes a controlling orifice to which said diaphragm is attached in sealing relation, and wherein said orifice plate is pronged to prevent plugging of the controlling orifice, said storage chamber being sealed from said diffuser by said diaphragm and being further sealed from said combustion chamber by said metal disk against the high pressure of the inflation gas stored in said storage chamber, whereby as the pressure in the combustion chamber rises and exceeds the pressure of the stored inflation gas in said storage chamber upon ignition of said pyrotechnic charge, said metal disk ruptures since it is unsupported when the pressure in said combustion chamber exceeds the pressure in said storage chamber, and hot gas from the burning pyrotechnic charge heats the stored inflation gas in said storage chamber causing a rapid pressure rise therein so that when the pressure in said storage chamber exceeds the structural capability of said diaphragm rupture of the latter occurs allowing the heated gas to vent through said diffuser orifices into an air bag.

5. A hybrid inflator for an air bag comprising, a storage chamber for storing inflation gas under high pressure, said storage chamber being formed by a hollow cylindrical sleeve that is closed at one end and open at an opposite end, a pyrotechnic heater closing said opposite end of said sleeve, said pyrotechnic heater being recessed into said sleeve and including a combustion chamber having a pyrotechnic charge therein, a nozzle orifice, and a metal disk scored with a circular groove and attached around the perimeter thereof to an inner portion of said pyrotechnic heater in closing relation to said nozzle orifice with said circular groove located at a diameter that is larger than said nozzle orifice so that said metal disk can support pressure from the direction of said gas storage chamber, a diffuser having a plurality of orifices for dispensing inflation gas from said storage chamber uniformly into an air bag, a diaphragm, and an orifice plate, wherein said diffuser includes a controlling orifice to which said diaphragm is attached in sealing relation, and wherein said orifice plate is dimpled to prevent plugging of the controlling orifice, said storage chamber being sealed from said diffuser by said diaphragm and being further sealed from said combustion chamber by said metal disk against the high pressure of the inflation gas stored in said storage chamber, whereby as the pressure in the combustion chamber rises and exceeds the pressure of the stored inflation gas in said storage chamber upon ignition of said pyrotechnic charge, said metal disk ruptures since it is unsupported when the pressure in said combustion chamber exceeds the pressure in said storage chamber, and hot gas from the burning pyrotechnic charge heats the stored inflation gas in said storage chamber causing a rapid pressure rise therein so that when the pressure in said storage chamber exceeds the structural capability of said diaphragm rupture of the latter occurs allowing the heated gas to vent through said diffuser orifices into an air bag.

* * * * *

UNITED STATES PATENT AND TRADEMARK OFFICE
CERTIFICATE OF CORRECTION

Figure 2:
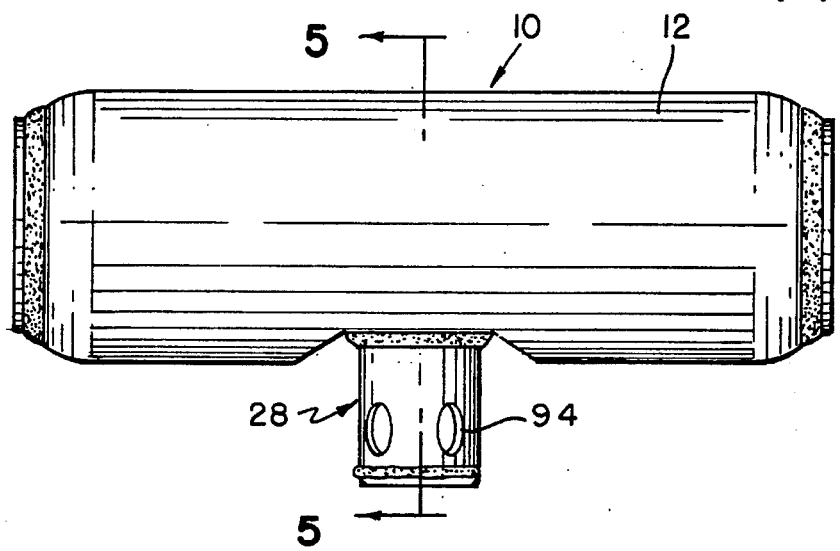
Figure 3:
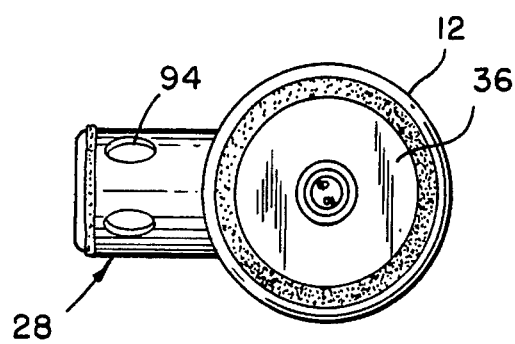

PATENT NO. : 5,456,492
DATED : Oct. 10, 1995
INVENTOR(S) : Bradley W. Smith et al, It is certified that error appears in the above-indentified patent and that said Letters Patent is hereby corrected as shown below:

At column 7, line 50, "FIG. 1, 2 and 3" should be
--FIGS. 1, 2 and 3--.

At column 14, line 22, "device of the inventions" should be
--device of the invention--.

At column 20, line 10, "an orifice" should be
--an orifice plate,--.

Signed and Sealed this

Ninth Day of July, 1996

Attest:

BRUCE LEHMAN

*Attesting Officer*      *Commissioner of Patents and Trademarks*